United States Patent [19]

Rysko et al.

[11] Patent Number: 5,155,729
[45] Date of Patent: Oct. 13, 1992

[54] FAULT RECOVERY IN SYSTEMS UTILIZING REDUNDANT PROCESSOR ARRANGEMENTS

[75] Inventors: Glenn M. Rysko; William C. Jordan, both of Cupertino, Calif.

[73] Assignee: ROLM Systems, Santa Clara, Calif.

[21] Appl. No.: 518,055

[22] Filed: May 2, 1990

[51] Int. Cl.⁵ ............................................ G06F 11/00
[52] U.S. Cl. .................................... 371/9.1; 371/16.3
[58] Field of Search .................. 371/9.1, 16.3, 61, 62; 364/200 MS File

[56] References Cited

U.S. PATENT DOCUMENTS

| Re. 32,286 | 11/1986 | Imai et al. | 371/9.1 |
|---|---|---|---|
| 3,890,493 | 6/1975 | Burtness et al. | 235/153 |
| 3,991,407 | 11/1976 | Jordan et al. | 364/200 |
| 4,371,754 | 2/1983 | De et al. | 179/18 |
| 4,432,048 | 2/1984 | Ito et al. | 371/9.1 |
| 4,513,417 | 4/1985 | Lamb et al. | 371/12 |
| 4,538,273 | 8/1985 | Lasser | 371/62 |
| 4,610,013 | 9/1986 | Long et al. | 371/9.1 |
| 4,627,060 | 12/1986 | Huang et al. | 371/62 |
| 4,635,258 | 1/1987 | Salowe | 371/16 |
| 4,654,821 | 3/1987 | Lapp | 364/900 |
| 4,696,002 | 9/1987 | Schleupen et al. | 371/12 |
| 4,727,549 | 2/1988 | Tulpule et al. | 371/62 |
| 4,752,930 | 6/1988 | Kitamura et al. | 371/62 |
| 4,890,284 | 12/1989 | Murphy et al. | 371/9.1 |
| 5,012,435 | 4/1991 | Bailey et al. | 371/16.3 |
| 5,027,269 | 6/1991 | Grant et al. | 371/9.1 |

FOREIGN PATENT DOCUMENTS 0004848 1/1981 Japan.
0168552 9/1984 Japan.

Primary Examiner—Joseph L. Dixon
Assistant Examiner—Phung My Chung
Attorney, Agent, or Firm—Michael B. Einschlag

[57] ABSTRACT

Apparatus to prevent endless switchover attempts between processors in redundant processor systems where each processor resets an associated watch dog timer (WDT). Whenever a WDT times out, WDT sends a restart signal to its associated processor and a failure signal to switchover control logic. The switchover control logic causes a switch from the active processor to the standby processor if the standby processor is healthy and is properly resetting its WDT and, if the standby processor is not, the switchover control logic will generate a signal to cause a cold reboot of the entire system. However, if the standby processor is healthy, the switchover control logic will generate a signal to cause a switchover to the standby and will generate a signal to increment a switchover counter. The value of the switchover counter is compared with a predetermined threshold value. If the value of the switchover counter matches the predetermined threshold value, a signal is generated to cause a cold reboot of the entire system. A timer associated with the switchover counter periodically clears the switchover counter. Thus, if the system is switching back and forth between the redundant processors at a rate which causes the switchover counter to exceed the predetermined threshold before the switchover counter can be cleared by the timer, the system will perform a cold reboot.

5 Claims, 3 Drawing Sheets

FAULT RECOVERY IN SYSTEMS UTILIZING REDUNDANT PROCESSOR ARRANGEMENTS

TECHNICAL FIELD OF THE INVENTION

The present invention pertains generally to a system wherein a redundant processor arrangement provides backup processing capabilities in the event that a primary or active processor system is non-operational. Examples of such a system are, without limitation, a telecommunication system, a computer system, an industrial control system, and so forth. Further, the present invention pertains, in particular, to systems utilizing redundant computer systems in a switchover control apparatus for a private branch exchange (PBX) telephone communications system.

BACKGROUND OF THE INVENTION

Many present day computer systems require high availability service for particular applications. For example, applications in which such high availability service is typically required are hospital systems, telecommunications systems, certain computing applications, certain control applications, and so forth. Further, in such applications where high availability service is of importance, redundant elements are quite often utilized to provide backup capabilities in the event that one element of the system becomes non-operational. For example, it is common to utilize redundant arrangements of central processing units (CPUs) and, in addition, most such redundant arrangements of CPUs utilize a peer-to-peer relationship, i.e., they share common peripherals such as, for example, disk storage and communication bus structures.

One such redundancy arrangement which is well known in the art involves the use of a standby processor which is operational but which is not used to provide processing capabilities until a primary or active processor, i.e., currently operating processor, becomes non-operational. In a system which utilizes such a redundancy arrangement, when the primary or active processor fails, the system switches control to the standby processor and the system continues to operate. The faulty processor is then serviced, either by restarting the faulty processor to correct an error caused by a transient fault or by replacing the faulty processor to correct a permanent fault. More specifically, in operation, such a redundancy arrangement requires the system to utilize a backup processor if the primary or active processor experiences a loss of processing capability for some predetermined reason. Thus, the switch in control to the backup processor occurs after the system has detected a loss of processing capability, i.e., has detected a problem. Further, to meet predetermined system requirements, the redundancy arrangement must switch from the primary or active processor to the backup processor with minimal, if any, loss of service. A typical such redundant arrangement utilizes "on-line" or "warm" duplexed processors. In such an arrangement, data bases associated with the backup processor are constantly updated to ensure readiness for immediate operation whenever a switchover occurs.

Several fault control schemes presently exist in the art. For example, U.S. Pat. No. 4,371,754 discloses a hierarchical fault recovery system for a telecommunication switching apparatus. The disclosed fault recovery system takes progressively more pervasive steps in an effort to rectify a problem. Included in such steps are: (a) rewriting active memory units from standby memory units; (b) switching between active and standby memory units; and (c) switching CPUs. Additionally, the disclosed fault recovery system will, if required, reload all of part of the source program from disk.

Further, U.S. Pat. No. 4,635,258 discloses another example, of a fault detection apparatus. The disclosed apparatus contains circuitry which, after detecting potential faults, causes a system to reset itself. Additional circuitry limits the number of resets which are permitted to occur with a predetermined time interval.

In addition to the above-mentioned systems disclosing fault isolation and handling, there is the senario of simultaneous duplex CPU failure and, more specifically, the difficulty of dealing with such an occurrence. In particular, if both CPUs in a redundant computer system become corrupted simultaneously and irreconcilably, certain such computer systems will begin convulsive switchovers, an effect which referred to in the art as "ping-pong."

However, there is little protection for the failure situation where an endless loop within code causes endless switchovers from one processor to the other. This endless loop can be caused by corrupted code, or it may be the result of a defect originally in the code which is only apparent when a certain function is performed.

As a result of the above, there is a need for a method and apparatus for preventing endless switchover attempts, i.e., "ping-pong" between redundant processors. In particular, there is a need for such a method and apparatus for use within a redundant telephony switching apparatus wherein "ping-pong" may be caused by corrupted or defective code: (a) which may have resulted from a defect which is produced during program execution; (b) which may be an inherent, original program defect; or (c) which may be corrupted during feature invocation and, as a result, will fail in a code path which is totally disjoint from that of system initialization.

SUMMARY OF THE INVENTION

Embodiments of the present invention advantageously satisfy the above-identified need in the art and provide method and apparatus for use in systems comprised of redundant processing systems to prevent endless switchover attempts, i.e., "ping-ponging," between the redundant processing systems.

In general, an embodiment of the present invention operates as follows in a system wherein each processing system is responsible for resetting an associated watch dog timer (WDT) within a predetermined period of time, the WDT being useful for detecting occurrences such as infinite loops within a program being executed by its associated processor. As is well known, whenever a WDT times out, i.e., the predetermined period of time being exceeded before the WDT is reset, the WDT sends a restart signal to its associated processor. In accordance with the present invention, the WDT also sends a failure signal to switchover control logic. The switchover control logic will cause a switch from the active processor to the standby processor if the standby processor is healthy, i.e., acting in accordance with designed requirements, and is properly resetting its WDT and, if it is not, the switchover control logic will generate a signal that will cause a cold reboot of the entire system. However, if the standby processor is healthy, the switchover control logic will generate a signal which will cause a switchover to the standby and will generate a signal to increment a switchover counter. The value of the switchover counter is compared with a predetermined threshold value. If the value of the switchover counter matches the predetermined threshold value, a signal is generated which will cause a cold reboot of the entire system. In addition, a timer associated with the switchover counter periodically clears the switchover counter to set its count to zero. Thus, if the system is switching back and forth between the redundant processors at a rate which causes the switchover counter to exceed the predetermined threshold before it can be cleared by the timer, the system will perform a cold reboot.

Note that, in practice, the time period of the timer must be much greater, for example, at least an order of magnitude, greater than that of the WDT. If this were not the case, the threshold could never be reached and the advantageous operation of the switchover event counters would be mitigated.

Further, in a preferred embodiment of the present invention, the switchover control logic is comprised of a first switchover control logic circuit which is associated with the first processing system and a second switchover control logic circuit which is associated with the second processing system.

As is well known to those of ordinary skill in the art, a cold boot, for example, causes a processing system such as a CPU to perform an initial program load from, for example, disk. Thus, in effect, in accordance with the present invention, the inventive switchover control apparatus causes a common control to perform, for example, an initial program load (IPL) so that the loading of a "fresh copy" of the source program into CPU memory may correct the continuous switchover problem referred to as "ping-pong."

BRIEF DESCRIPTION OF THE DRAWING

A complete understanding of the present invention may be gained by considering the following detailed description in conjunction with the accompanying drawing, in which.

DETAILED DESCRIPTION

Figure 1:
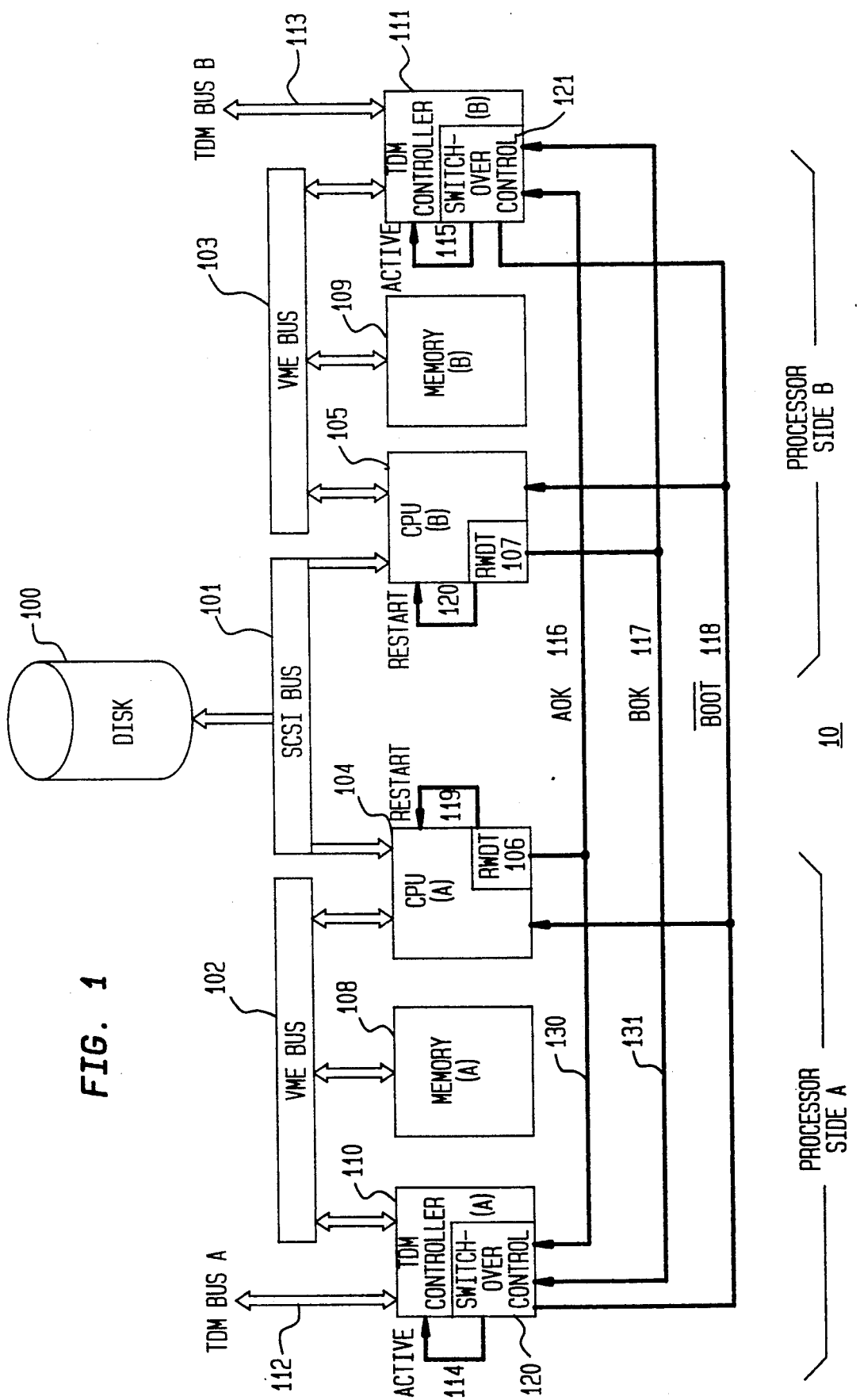
FIG. 1 is an block diagram of relevant portions of a system which comprises a redundant processor arrangement which is fabricated in accordance with the present invention to prevent endless processor switchovers.

FIG. 1 is an block diagram of relevant portions of a system comprised of a redundant processor arrangement which is fabricated in accordance with the present invention to prevent endless processor switchovers. Although the preferred embodiment of the present invention is described in the context of a system which is comprised of a redundant processor arrangement which is used to control a telephony switching system, those of ordinary skill in the art will readily appreciate that the present invention is not limited to use in this telephony environment and that it may be used in other appropriate environments.

As shown in FIG. 1, system 10 is comprised of storage device 100 which stores a permanent copy of a control program. Illustratively, as shown in FIG. 1, storage device 100 is a magnetic disk. The control program is loaded into memories 108 and 109 which are associated with processors 104 and 105, respectively. In addition, as is further shown in FIG. 1, processors 104 and 105 each have access to the control program in storage device 100 by means of SCSI bus 101. Further in addition, with the exception of SCSI bus 101 and storage device 100, each relevant element of system 10 is duplicated and, as shown in FIG. 1, the redundant portions of system 10 are referred to as processor side A and processor side B.

In particular, processor side A has its own processor bus, processor VME bus 102, and processor side B has its own processor bus, processor VME bus 103. Each processor can communicate with its own local memory and TDM controller. Specifically, processor 104 communicates over processor VME bus 102 with: (a) memory 108 and (b) TDM controller 110 and processor 105 communicates over processor VME bus 103 with: (a) memory 109 and (b) TDM controller 111.

Memory 108 stores an operational copy of the control program which runs on processor 104 and memory 109 stores a operational copy of the control program which runs on processor 105. TDM controller 110 controls TDM bus 112 and is comprised of master switchover control logic 120 which will be described below in connection with FIG. 2. TDM bus 112 passes communications information from processor side A to the remainder of the telephone switching system (not shown). TDM controller 111 controls TDM bus 113 and is comprised of slave switchover control logic 121 which will be described below in connection with FIG. 3. TDM bus 113 passes communications information from processor side B to the remainder of the telephone switching system.

As is well known to those of ordinary skill in the art, TDM bus 112 and TDM bus 113 are connected to the telephony system and either bus may control the telephony system. For example, commands may be sent over bus 112 and 113 which inform the telephony system which processor side, i.e., processor side A or processor side B, is the primary or active processor and which processor is the standby processor. These commands are then used by the telephony system in interacting with system 10. Further, when the status of the processors change from active to standby and vice versa, commands which are sent of bus 112 and 113 relay this information to the telephony system. Of course, those of ordinary skill in the art recognize that this is merely one of a whole host of ways in which a redundant arrangement such as the one shown as system 10 in FIG. 1 may interact with the rest of the system and, as such, the present invention is not limited to only one of these ways for interacting.

Lastly, processor 104 is associated with restart watch dog timer circuit 106 and processor 105 is associated with restart watch dog timer 107, restart watch dog timers are circuits which are well known to those of ordinary skill in the art. For example, a watch dog timer may be a monostable multivibrator circuit such as a 74121 chip which is available from Texas Instruments. Further, in accordance with methods that are well known to those of ordinary skill in the art, software in a CPU which is associated with a watch dog timer will periodically cause a signal to be generated to "pat" or reset the watch dog timer to prevent it from timing out and restarting the system. For example, such a typical watch dog timer restart entails the generation of an interrupt which may cause the CPU to branch to a predetermined address in memory in order to restart the main program from a predetermined location.

In operation, system 10 is first started by means of a cold boot process. As is well known to those of ordinary skill in the art, a cold boot process entails, for example, jumping to a predetermined address and starting a boot loader to load a copy the control program into memories 108 and 109 of processors 104 and 105, respectively. Once the control program has been loaded into memories 108 and 109, processors 104 and 105 each starts its own operation from a predetermined location in memories 108 and 109, respectively. Further, as a part of this initialization process, restart watchdog timers 106 and 107 which are associated with processors 104 and 105, respectively, are enabled. Still further, as will be explained in detail below: (a) processor side A is chosen as the primary processor if processor side A is good and processor B is bad or if processor side A is good and processor side B is good and (b) processor side B is chosen as the primary processor if processor side A is bad and processor side B is good. For this embodiment of the present invention, restart watch dog timers 106 and 107 each have an expiration period of 1 second.

Once system 10 has been started and restart watchdog timers 106 and 107 have been enabled, the control program which is running in processor 104 and the control program which is running in processor 105 must continually reset or "pat" restart watchdog timers 106 and 107, respectively, at intervals of less than one second. Whenever restart watchdog timer 106 expires: (a) it generates AOK signal 116 which is applied over lead 130 as input to switchover control logic 120 and 121 and (b) it generates a restart signal which is applied over lead 119 to processor 104. Processor 104 restarts in response to the restart signal over lead 119, as was explained above, by, for example, branching to a predetermined address to begin executing a predetermined section of code. Further, whenever restart watchdog timer 107 expires: (a) it generates BOK signal 117 which is applied over lead 131 as input to switchover control logic 120 and 121 and (b) it generates a restart signal which is applied over lead 120 to processor 105. Processor 105 restarts in response to the restart signal over lead 120, as was explained above, by, for example, branching to a predetermined address to begin executing a predetermined section of code. AOK signal 116 indicates that processor 104 has failed and BOK signal 107 indicates that processor 105 has failed by a logic low level. As is well known to those of ordinary skill in the art, restart watchdog timers 106 and 107 can expire as a result of either hardware, software, or transient faults which occur within processors 104 and 105, respectively, or within memories 108 and 109, respectively.

When an active processor fails, which failure is detected by the expiration of its associated restart watchdog timer, two events occur. First, the active processor is restarted in response to a signal which is input thereto over leads 119 and 120, respectively, and a switchover to the standby (inactive) processor occurs. The switchover from active to standby processor is performed in accordance with switchover control logic 120 and 121 which are described in connection with FIGS. 2 and 3.

Switchover control logic 120 and 121 determine which processor side, i.e., processor side A or processor side B, should be active and, in the case of multiple switchovers, when a cold boot should occur.

Figure 2:
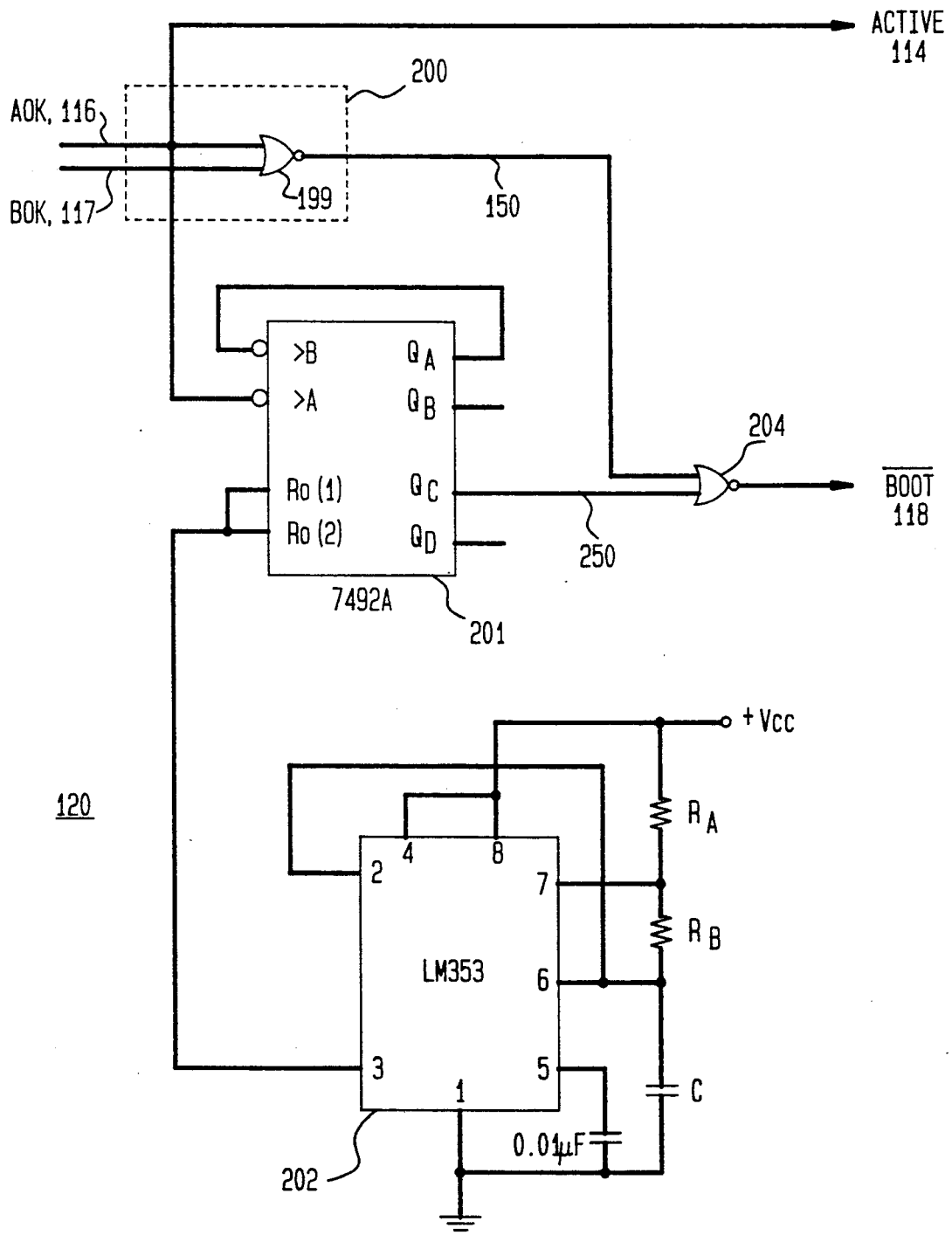
FIG. 2 is a block diagram of an embodiment of master switchover control logic which is used to control processor switchovers and cold boot operation in accordance with the present invention.

FIG. 2 is a block diagram of an embodiment of switchover control logic 120 which is used to control processor switchovers and cold boot operation in accordance with the present invention. In accordance with FIG. 2, AOK signal 116 and BOK signal 117 from processors 104 and 105, respectively, are applied as input to compare logic 200 which is comprised of NOR logic circuit 199. As should be readily apparent, switchover control logic 120 is the "master" switchover control logic circuit as between circuits 121 since active signal 114 is determined by AOK 116. Thus, processor side A is made the primary processor if processor side A is OK and processor side B is OK or not OK (This means that if AOK signal 116 indicates that processor 104 is functional and BOK signal 117 indicates that processor 105 has failed, then compare logic 200 in switchover control logic 106 asserts that processor side A should be active by generating active signal 114.). Active signal 114 is applied as input to TDM control 110. The manner in which processor side B is determined to be the active processor will be described with reference to FIG. 3.

Referring to FIG. 2, AOK 116, i.e., active 114 is applied to switchover counter 201 in switchover control logic 120. Switchover counter 201 is, for example, a 7492A divide by 12 counter. Switchover counter 201 counts the number of switchovers which occur by monitoring active signal 114 and incrementing a count whenever active signal 114 changes from active to inactive. Further switchover counter 201 compares its count with a predetermined threshold, in this embodiment for example, the predetermined threshold is 4, and, if the count exceeds the predetermined threshold, switchover counter 201 triggers a cold boot by generating a signal over lead 250 which is applied as input to NOR circuit 204. Further, as one of ordinary skill in the art can readily appreciate, a cold boot is also generated by the output from NOR 199 when both AOK 116 and BOK 117 indicate that both processor side A and processor side B have failed. The output of NOR circuit 204, cold boot signal 11B is applied as input, as is shown in FIG. 1, to processors 104 and 105 to reboot system 10.

Timer 202 of switchover control logic 120 periodically clears the count in switchover counter 201 to zero. The time period for periodically resetting the counter of switchover counter 201 is determined, for example, by hardware design and is set thereby to a predetermined value, i.e., $R_A$, $R_B$, and C are chosen to select the time period to clear switchover counter 201. A threshold is imposed on this count with respect to time such that only a fixed number of switchovers can occur within a predetermined amount of time. If the threshold is reached within this time period, a cold boot will be started. In accordance with the present invention, it is expected that the cold boot which reloads a "fresh" copy of the programs into memory may correct the problem which is causing the multiple switchovers.

As one can readily appreciate from this, the combination of the counter of switchover counter 201 and timer 202 permit a predetermined number of switchovers to occur within a predetermined time period. If this predetermined number of switchovers with the predetermined time period is exceeded, then switchover counter 201 instigates a cold boot. In addition, as was explained above, if processors 104 and 105 have both failed so that AOK signal 116 and BOK signal 117 are both generated, then compare logic 200 will generate boot signal 150 which is applied as input to NOR logic 204. In response, NOR logic 204 will generate cold boot signal 118.

Figure 3:
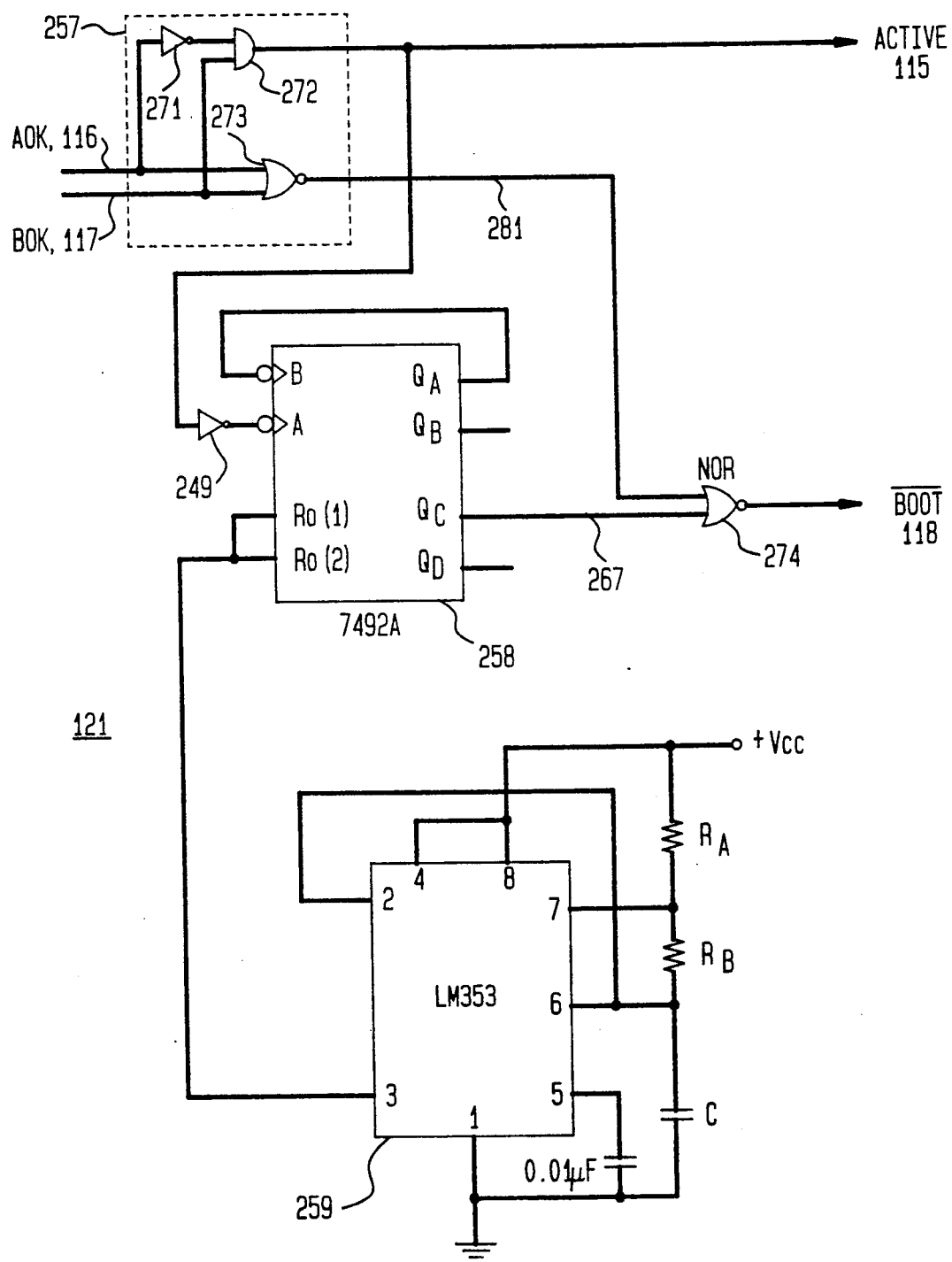
FIG. 3 is a block diagram of an embodiment of slave switchover control logic which is used to control processor switchovers and cold boot operation in accordance with the present invention.

FIG. 3 is a block diagram of an embodiment of switchover control logic 121 which is used to control processor switchovers and cold boot operation in accordance with the present invention. In accordance with FIG. 3, AOK signal 116 and BOK signal 117 from processors 104 and 105, respectively, are applied as input to compare logic 257 which is comprised of gates 271, 272, and 273. As should be readily apparent, switchover control logic 121 is the "slave" switchover control logic circuit as between circuits 121 since active signal 115 is generated only when AOK 116 indicates that processor 104 is bad and BOK 117 indicates that processor 105 is good. Thus, processor side B is made the primary processor if processor side B is OK and processor side A is not-OK. Active signal 115 is applied as input to TDM control 111.

Referring to FIG. 3, active 115 is inverted by gate 249 and applied to switchover counter 258 in switchover control logic 121. Switchover counter 258 is the same as switchover counter 201 in switchover control logic 120 and it operates in a similar manner to provide a similar function, i.e., it increments a count whenever active signal 115 changes from a logic low level to high. Further, switchover counter 258 compares its count with a predetermined threshold, in this embodiment for example, the predetermined threshold is 4, and, if the count exceeds the predetermined threshold, switchover counter 258 triggers a cold boot by generating a signal over lead 267 which is applied as input to NOR circuit 274. Further, as one of ordinary skill in the art can readily appreciate, a cold boot is also generated by the output from NOR 273 when both AOK 116 and BOK 117 indicate that both processor side A and processor side B have failed. The output of NOR circuit 274, cold boot signal 118 is applied as input, as is shown in FIG. 1, to processors 104 and 105 to reboot system 10.

Timer 259 of switchover control logic 121 is the same as timer 202 in switchover control logic 120 and it operates in a similar manner to provide a similar function, i.e., periodically it resets the count in switchover counter 258 to zero. The time period for periodically resetting the counter of switchover counter 259 is determined, for example, by hardware design and is set thereby to a predetermined value, i.e., $R_A$, $R_B$, and C are chosen to select the time period to clear switchover counter 258. A threshold is imposed on this count with respect to time such that only a fixed number of switchovers can occur within a predetermined amount of time. If the threshold is reached within this time period, a cold boot will be started. In accordance with the present invention, it is expected that the cold boot which reloads a "fresh" copy of the programs into memory may correct the problem which is causing the multiple switchovers.

As one can readily appreciate from this, the combination of the counter of switchover counter 258 and timer 259 permit a predetermined number of switchovers to occur within a predetermined time period. If this predetermined number of switchovers with the predetermined time period is exceeded, then switchover counter 258 instigates a cold boot. In addition, as was explained above, if processors 104 and 105 have both failed so that AOK signal 116 and BOK signal 117 are both generated, then compare logic 257 will generate boot signal 281 which is applied as input to NOR logic 274. In response, NOR logic 274 will generate cold boot signal 118.

As one can readily appreciate from the above, the inventive switchover control apparatus operates as follows. Each processor is responsible for resetting its associated WDT within a predetermined period of time, the WDT being useful for detecting occurrences such as infinite loops within a program being executed by its associated processor Should the WDT time out, i.e., the predetermined period of time being exceeded before the WDT is reset, the WDT sends a restart signal to its associated processor and the WDT sends a failure signal to switchover control logic which is associated with the processor. The switchover control logic will cause a switch from the active processor to the standby processor if the standby processor is healthy, i.e., acting in accordance with designed requirements, and is properly resetting its WDT and, if it is not, the switchover control logic logic will generate a signal that will cause a cold reboot of the entire system. However, if the standby processor is healthy, the switchover control logic will generate a signal which will cause a switchover to the standby and will generate a signal to increment an associated switchover counter—the switchover counter is incremented by, for example, clocking it. The value of the switchover counter is compared with a predetermined threshold value. If the value of the switchover counter matches the predetermined threshold value, a signal is generated which will cause a cold reboot of the entire system. In addition, a timer associated with the switchover counter periodically clears the switchover counter to set its count to zero. Thus, if the system is switching back and forth between the redundant processors at a rate which causes the switchover counter to exceed the predetermined threshold before it can be cleared by the timer, the system will perform a cold reboot.

Note that, in practice, the time period of the timer must be much greater, for example, at least an order of magnitude, greater than that of the WDT. If this were not the case, the threshold could never be reached and the advantageous operation of the switchover event counters would be mitigated.

Further, those skilled in the art recognize that further embodiments of the present invention may be made without departing from its teachings. For example, although the above-described preferred embodiment of the present invention utilized a predetermined switchover threshold whose value is determined by hardware, it should be appreciated that in other embodiments of the present invention the default value of the predetermined switchover threshold may be changed by a processor command which is implemented in software. Further, although the above-described preferred embodiment of the present invention utilize a switchover control logic circuit for each processor, namely switchover control logic 120 associated with processor 104 and switchover control logic 121 associated with processor 105, it should be appreciated that in other embodiments of the present invention only one switchover control logic circuit need be used. However, the above-described embodiment is preferred because duplicate switchover control logic circuitry minimizes any single point of failure in the system. Specifically, if the timer or counter on one of these circuits failed, the circuit on the other side of the system would perform the boot function. Additionally, the preferred embodiment reduces the number of signals on the backplane.

What is claimed is:

1. Apparatus for use in a system comprised of a first processing system and a second processing system, the first and second processing systems being redundant processing systems whereby one of the first and second processing systems is an active processing system and the other one of the first and second processing systems is a standby processing system, the apparatus being used to prevent endless switchovers between the active processing system and the standby processing system, a switchover being an event wherein the active processing system becomes the standby processing system and vice versa, wherein the first processing system is associated with a first watch dog timer (WDT) and the second processing system is associated with a second WDT, wherein each of the first and second processing systems attempts to reset the WDT associated therewith within a predetermined period of time, and wherein the WDT associated with each processing system sends a restart signal to that processing system if the WDT has not been reset thereby, the apparatus comprising:

each of the WDTs further comprising means for outputting a YESORNO-OK signal which indicates whether or not the WDT has issued a restart signal and
   for applying the YESORNO-OK signal from both of the WDTs to switchover control logic means;
   the switchover control logic means being means, in response to the YESORNO-OK signals from both of the WDTs, for generating at least one switchover signal to cause a switchover wherein the active processing system becomes the standby processing system and vice versa if the YESORNO-OK signal from the WDT associated with the active processing system indicates that the active processing system has issued a restart signal and the YESORNO-OK signal from the WDT associated with the standby processing system indicates that the standby processing system has not issued a restart signal and, if the standby processing system has also issued a restart signal, the switchover control logic means being means for generating a reboot signal to cause a reboot of the system;
   the switchover control logic means further comprising:
   timer means for generating a timing signal at a predetermined time interval; and
   switchover counter means, responsive to at least one of the at least one switchover signal, for counting the number of switchovers which occur, the switchover counter means being further responsive to the timing signal for clearing the count of switchovers;
   wherein the switchover counter means further comprises means for generating the reboot signal to cause a reboot of the system whenever the count of switchovers maintained by the switchover counter means exceeds a predetermined amount.

2. The apparatus of claim 1 wherein the switchover control logic means comprises first switchover control logic means associated with the first processing system and second switchover control logic means associated with the second processing system.

3. The apparatus of claim 2 wherein the YESORNO-OK signal output from each WDT is applied to the first and second switchover control logic means.

4. The apparatus of claim 3 wherein one of the first and second switchover control logic means comprises means, after the system is rebooted, for generating a signal to cause the processing system associated therewith to be the active processing means.

5. Apparatus for use in a system comprised of a first processing system and a second processing system, the first and second processing systems being redundant processing systems whereby one of the first and second processing systems is an active processing system and the other one of the first and second processing systems is a standby processing system, the apparatus being used to prevent endless switchovers between the active processing system and the standby processing system, a switchover being an event wherein the active processing system becomes the standby processing system and vice versa, wherein the first processing system is associated with a first watch dog timer (WDT) and the second processing system is associated with a second WDT, wherein each of the first and second processing systems attempts to reset the WDT associated therewith within a predetermined period of time, and wherein the WDT associated with each processing system sends a restart signal to that processing system if the WDT has not been reset thereby, the apparatus comprising:

each of the WDTs further comprising means for outputting a YESORNO-OK signal which indicates whether or not the WDT has issued a restart signal and for applying the YESORNO-OK signal from the first and second WDT to both the first and second switchover control logic means;
   the first and second switchover control logic means being means, in response to the YESORNO-OK signals from both of the WDTs, the generating at least one switchover signal to cause a switchover wherein the active processing system becomes the standby processing system and vice versa if the YESORNO-OK signal from the WDT associated with the active processing system indicates that the active processing system has issued a restart signal and the YESORNO-OK signal from the WDT associated with the standby processing system indicates that the standby processing system has not issued a restart signal and, if the standby processing system has also issued a restart signal, the switchover control logic means being means for generating a reboot signal to cause a reboot of the system;
   the first and second switchover control logic means further comprising:
   timer means for generating a timing signal at a predetermined time interval; and
   switchover counter means, responsive to at least one of the at least one switchover signal, for counting the number of switchover which occur, the switchover counter means being further responsive to the timing signal for clearing the count of switchovers;
   wherein the switchover counter means further comprises means for generating the reboot signal to cause a reboot of the system whenever the count of switchovers maintained by the switchover counter means exceeds a predetermined amount.

* * * * *